United States Patent [19]

Richman

[11] Patent Number: 5,078,090

[45] Date of Patent: Jan. 7, 1992

[54] ARTICLE POWDERING APPARATUS

[76] Inventor: Scott D. Richman, 184 E. Washington Ave., Chico, Calif. 95926

[21] Appl. No.: 503,242

[22] Filed: Apr. 2, 1990

[51] Int. Cl.$^5$ .................... B05C 19/04; B05C 19/06
[52] U.S. Cl. .................... 118/702; 118/704; 118/25; 118/31; 118/308; 118/309; 118/501; 118/13
[58] Field of Search ............ 118/13, 22, 308, 309, 118/500, DIG. 6, 702, 704, 25, 31, 501

[56] References Cited

U.S. PATENT DOCUMENTS

| | | | |
|---|---|---|---|
| 710,443 | 10/1902 | Dupont | 118/308 |
| 976,443 | 11/1910 | Doering | 118/309 |
| 1,767,633 | 6/1930 | Weber et al. | 118/13 |
| 1,808,696 | 6/1931 | Van Houten | 118/13 |
| 1,850,576 | 3/1932 | Zimmerman | 118/309 |
| 1,985,238 | 12/1934 | Brodgen | 118/309 |
| 2,173,032 | 9/1939 | Wintermute | 118/309 |
| 2,682,723 | 7/1954 | Oberg | 118/308 |
| 2,742,867 | 4/1956 | Rhodes | 118/13 |
| 3,036,533 | 5/1962 | Burt et al. | 118/309 |

Primary Examiner—Michael Wityshyn
Assistant Examiner—Todd J. Burns

[57] ABSTRACT

A housing forming an internal powdering chamber in which an article support tray is removably supported. A hopper located on the exterior top of the housing is structured to dispense a metered amount of powder onto a powder distributor and sifting screen located in the top interior of the housing. An electric motor powering a wheel with an eccentrically connected actuator arm and linkage are connected to the powder distributor and sifting screen in order to supply an oscillatory movement thereto. The powder distributor also includes powered shuttered apertures to allow the powder to be distributed evenly on the powder distributor before being opened to allow the powder onto the sifting screen. The powder distributor and sifting screen are structured to evenly distribute a fine coating of powder vertically downward toward the article support tray. Power actuated lifting arms are located one on each interior corner of the housing slightly below the article support tray. The tray lifting arms are timer controlled to sequentially elevate the corners of the article support tray sufficiently to angle the position of articles thereon relative to vertically falling powder from the sifting screen. Apertures in the article support tray allow powder passing between the articles on the tray to fall through the apertures and into a collection drawer in the bottom of the housing. The apparatus also includes timing and sequencing means to control the powder distribution.

2 Claims, 10 Drawing Sheets

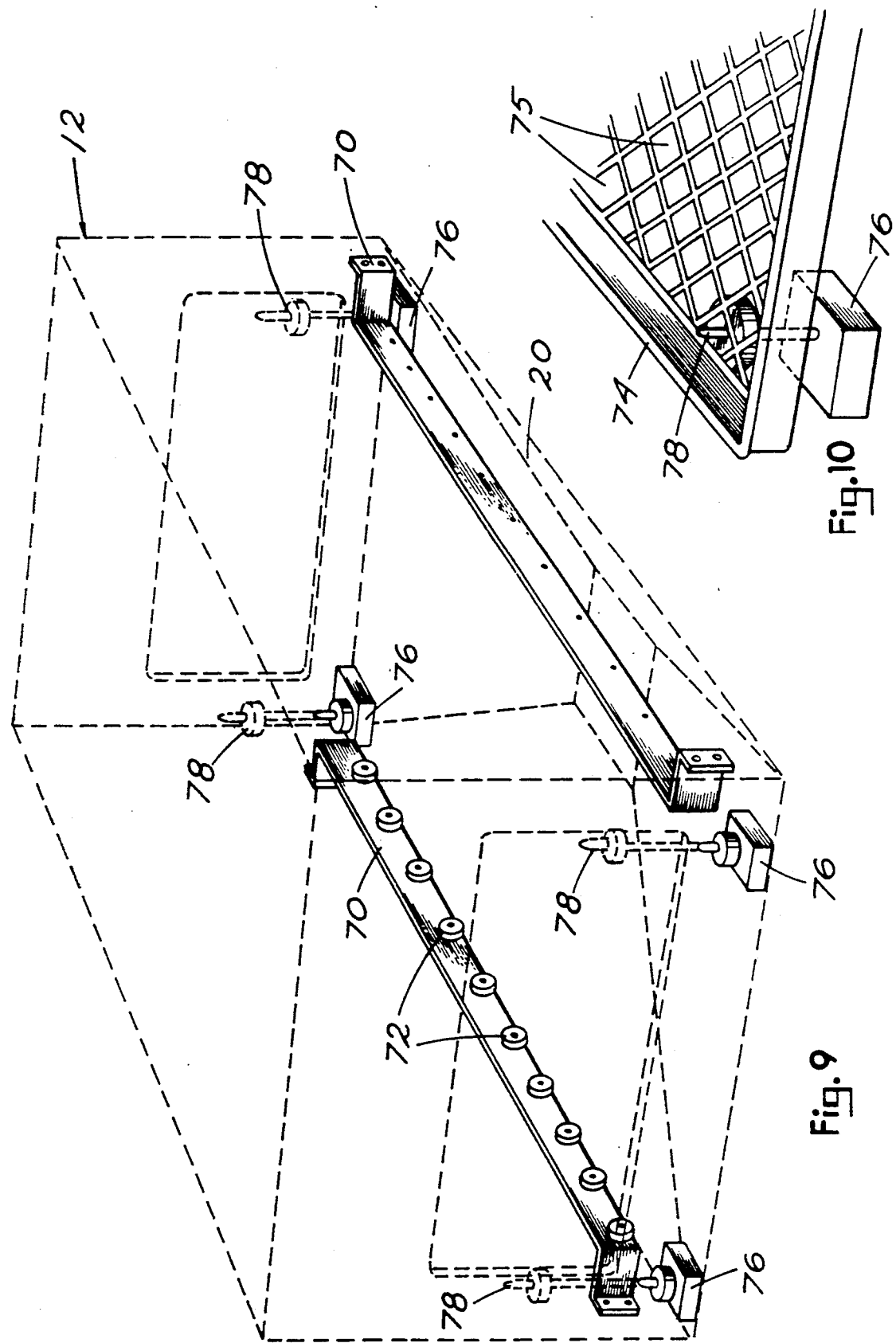

ARTICLE POWDERING APPARATUS

BACKGROUND OF THE INVENTION

1. Field of the Invention

This invention generally relates to equipment useful for applying a layer of powdered material to an article, and more particularly to an apparatus primarily structured to apply powders to the upper exposed surfaces of flat bottomed articles resting on an article support tray. The flat bottomed articles intended to be powdered by my apparatus are primarily food articles such as cookies and pastries, and non-food articles such as bread dough proofing baskets and molds. The invention is structured for evenly coating the upward facing surface as well as the exposed exterior or interior curved surfaces of an article. The apparatus is also structured in a manner to help maintain the amount of dust suspended in the air around bakery workers at a minimum.

2. Description of the Prior Art

In some commercial bakeries certain types of bread dough are placed into flat bottomed proofing baskets for the rising or proofing stage, with the dough later being removed from the baskets for baking. Proofing baskets are usually made of an open mesh material with the interior of the basket covered with a fabric liner. The basket liner is adapted to help prevent the dough from sticking to the basket. The basket liners must be dusted with a thin coating of dry flour before insertion of the moist dough. The thin coating of flour prevents the dough from sticking to the liner. The flour dusting process for individual proofing baskets with liners is currently being accomplished manually with either a hand held sifter or by hand-throwing small quantities of flour into the liner at various angles. The above described powdering procedures are not only quite time consuming, but the distribution of the flour on the basket liners is often inconsistent, leaving an excessive amount on the bottom of the liners, and not enough on the sides. A small area left un-floured or under-floured on the liner will cause the dough to stick to the liner, making it difficult to remove the dough without tearing or deforming the shape thereof. Proofing baskets and the liners therein are dish shaped having upwardly curved interior sidewalls. With the use of a hand held sifter, or any sifter position above the basket, the powdered material dispensed therefrom falls vertically downward onto the basket liners. When dusting proofing basket liners with a sifter, the vertically falling flour mainly falls onto the interior bottoms of the liners with very little of the flour landing and sticking to the upturned sidewalls of the liners. Also, since the flouring of the basket liners is manually performed in an open room, the air of the room fills with suspended flour dust making the atmosphere unhealthy to breath for the workers, and subject to a possible explosion under certain conditions. Suspended flour and most other powders in the air are considered to form an explosive or hazardous atmosphere which can be ignited with a small spark created by such unexpected elements as a standard light switch.

With certain types of food articles such as cookies, and pastries or the like, it is sometimes desirable to apply a light layer of powdered sugar to the exposed surfaces thereof for both taste and aesthetic reasons. These food articles are generally flat bottomed and have outside edges which curve under toward the flat bottom. These under-curved edges are difficult to apply powders to, and many feel it is desirable to apply powder in this area.

A prior art search was conducted in the U.S. Patent and Trademark Office for devices useful for applying a layer of powdered material to an article, particularly food articles and equipment associated therewith. Of the documents examined, the following teach devices considered somewhat pertinent to my invention, and are generally typical of the state of the art in powdering devices;

On May 29, 1962, H. B. Burt et. al. was issued U.S. Pat. No. 3,036,533 for a method and apparatus for coating food articles with small particles. The Burt device uses conflicting currents of air created by a fan to randomize the direction of movement of the coating particles within a coating chamber toward the articles to be coated. A conveyor belt is employed for moving the articles through the coating chamber.

E. M. Brogden was issued U.S. Pat. No. 1,985,238 on Dec. 25, 1934, for a device used in the treatment of fresh fruit in preparation for market. The Brogden device is designed to apply fine, dust-like particles of wax onto fruit which are later polished with rotating brushes. The wax particles are passed through a sifting device which can be oscillated for downward dispersion of the particles onto the fruit.

Brogden does not detail structuring for evenly dispersing the wax particles onto the sifting screen prior to oscillation. Failing to evenly disperse the particles onto a tray-like sifting device as shown, can lead to an uneven passage of the dust-like particles through the screen. A larger amount of particles fall through the screen at the location the particles are dumped onto the screen relative to the amount dispensed through the outer edges of the screen. This uneven distribution "may" not be important for articles passing through the dusting chamber on a moving conveyor belt, but would be important for articles intended to be dusted which were generally stationary in a dusting chamber. It is also noted the wax particles are dispensed vertically downward which would make coating of curved sides of the fruit difficult were Brogden not employing a continuous conveyor system which rolls the fruit as it passes through the dusting chamber. Brogden further uses rotating brushes to create a cloud or fog of the dust-like particles in the enclosed space.

It is not feasible to rotate or roll certain articles, particularly flat bottomed articles such as proofing baskets, cookies and pastries to name just a few. The rolling of articles can leave marks in the applied powder, and can knock off the dry powder with a small amount of jarring.

It is generally considered undesirable to create clouds of suspended dust even within a dust tight housing since the air-suspended dust will escape through an open door of the housing. With powdering chambers utilizing "dust clouds" and having doors adapted to be opened and closed to retrieve powdered articles, an excessive amount of time must be permitted to pass before opening the door in order to allow most of the powder to settle out of the air.

Although the Burt and Brogden devices are similar in concept, the structuring and functioning of their equipment differs significantly from mine. The conflicting currents of air used in both the Burt and Brogden devices to randomly disperse the coating particles would generally not be effective for coating deep, dish shaped proofing baskets since wind currents have a tendency to avoid flowing into small closed bottom structures like proofing baskets with liners. Although air can and does pass through a proofing basket and liner to a degree, it does not pass all that freely. Also, the intentionally created dust clouds in both the Burt and Brogden apparatuses would take an excessive amount of time to settle, either slowing down the processing, or allowing dust to escape into the atmosphere when a door of the chamber was opened to remove or insert articles in an apparatus such as mine. My apparatus overcomes these and other disadvantages, and provides new and useful benefits to article powdering equipment not previously provided in past art devices structured for similar purposes.

SUMMARY OF THE INVENTION

In practicing my invention I have provided an article powdering apparatus for applying a fine, even coating of dry powder onto an article. My invention is primarily structured to apply flour or sugar onto the upper exposed surfaces of flat bottomed articles. The flat bottomed articles intended to be powdered by my apparatus are primarily foods such as cookies, pastries, and articles such as bread dough proofing baskets, but the apparatus could be used to apply powder to just about any article. The invention is structured for evenly coating the upward facing surface as well as the exposed exterior or interior curved surface of an article.

My invention is structured of a generally dust tight housing defining an interior powdering chamber. Removably housed within the powdering chamber is an open mesh, article support tray for holding articles intended to be dusted. The article support tray can be inserted through a door on one end of the housing, and removed through a second door on the opposite end of the housing. A hopper located on the exterior top of the housing dispenses a proper amount of powder onto a powder distributor and sifting screen assembly located in the top interior of the housing. An electric motor powering a wheel with an eccentrically connected actuator arm and linkage are connected to the powder distributor and sifting screen assembly in order to supply an oscillatory movement thereto. The powder distributor and sifting screen assembly is positioned above the article support tray and is structured to evenly distribute a fine coating of powder over all the articles on the tray without creating an excessive suspension of dust in the air. Some dust is of course created, this is unavoidable with lightweight, finely ground powders, however I have structured my invention to keep the dust to a minimum. Maintaining the dust in the air at a minimum allows opening of the doors shortly after a dusting process, and increases the overall cycling rate of article support trays being placed into and removed from the powdering chamber.

Power actuated lifting arms or push cylinders are located one on each interior corner of the box-like housing slightly below the article support tray. The tray lifting arms are adapted to sequentially elevate the corners of the article support tray sufficiently to angle the position of the articles thereon relative to the vertically falling sifted powder. The repositioning or tilting of the article support tray and the articles thereon at various angles, when properly sequenced, allows the upwardly curved interior sidewalls of proofing basket liners or other articles to be evenly coated with vertically dropping powder. In the situation where cookies or pastries are being coated, the tilting of the support tray allows application of the vertically falling powder to the under-curved edges of the food articles which would normally not be coated without randomizing the movement of the powder in the dusting chamber using air currents or other randomizing methods.

Powder passing between the articles on the support tray falls through the open mesh of the tray onto a smooth surfaced, funnel-shaped floor of the housing where it is collected in a removable drawer. The actuation, timing and sequencing of all the power actuated elements of my apparatus are preferably controlled with a modern computerized programmable-controller (PC) capable of automatically turning devices on and off in the proper order and for the proper timed interval to increase both speed and accuracy in evenly distributing the powder onto articles. The PC, once programmed also reduces the necessary skill level of an operator. Once the programmable controller has been properly programed, an operator only has to push the start button, and the PC will operate my powdering apparatus completely through a powdering cycle, reset all the equipment in preparation for another powdering cycle, and then shut down. A start/stop electrical control station is located adjacent each door for initiating the timing and sequencing of the powered elements of the apparatus. The stop button is for shutting down the apparatus in the middle of a powdering cycle in an emergency.

Having a door and start/stop station on each end of the housing of my apparatus allows the rapid installation of a article support tray through one door, and the removal of the tray with powered articles thereon out the oppositely disposed door. This arrangement coupled with generally not having to wait for dust to settle within the powdering chamber can allow for rapidly powdering large numbers of articles.

Therefore, a primary object of the invention is to provide an article powdering apparatus structured to apply an even coating of powder to the upper exposed surfaces of flat bottomed food articles and the liners of dough proofing baskets.

A further object of the invention is to provide the above in an apparatus which is structured to help maintain the amount of air-suspended dust at a minimum.

An even further object of the invention is to provide the above in an apparatus which positions the food articles or dough proofing baskets at various angles for improved distribution and adherence of the powder onto the angled sides of the articles.

Other objects and advantages of my invention not yet specifically mentioned will be realized with a reading of the remaining disclosure and an examination of the accompanying drawings provided to exemplify one functional structuring of my invention.

BRIEF DESCRIPTION OF THE DRAWINGS

FIG. 1 is a right side view of the article powdering apparatus illustrating the leg supported box-like housing with the hopper located on the top surface, the motor with wheel having the eccentrically connected actuator arm and linkage located on the top right, and the removable powder catch drawer on the funnel-shaped bottom of the housing.

FIG. 2 is a left side view of the powdering apparatus.

FIG. 3 is a front end view of the powdering apparatus showing one of the two doors of the housing.

FIG. 4 is a rear end view of the powdering apparatus showing the second door of the housing.

FIG. 5 is a partial sectional right side view of the housing of my powdering apparatus. Illustrated are the hopper, the powder distributing and sifting screen assembly above the article support tray within the powdering chamber, dough proofing baskets on the support tray, rollers for supporting and guiding the article support tray, and the lower sloped walls of the housing adapted for directing the excess powder into the removable powder catch drawer. Shown in phantom within the housing is the article support tray angled upward relative to the vertically falling powder by one of the four article support tray lifting arms. Both doors are shown in the opened position for illustrative purposes, but would normally always be closed during the powdering process to contain any air suspended dust.

FIG. 9 is a perspective partial end view of the powdering apparatus with the housing shown by the dotted outline in order to illustrate the tray support brackets with attached rollers. Also shown are the four article support tray lifting arms attached one to each interior corner of the housing.

FIG. 10 is a perspective view of one corner of the article support tray and one lifting arm below the tray. A pointed disk on the top surface of the lifting arm is shown inserted into the open mesh of the floor of the tray preventing the tray from sliding when tilted.

Figure 11:
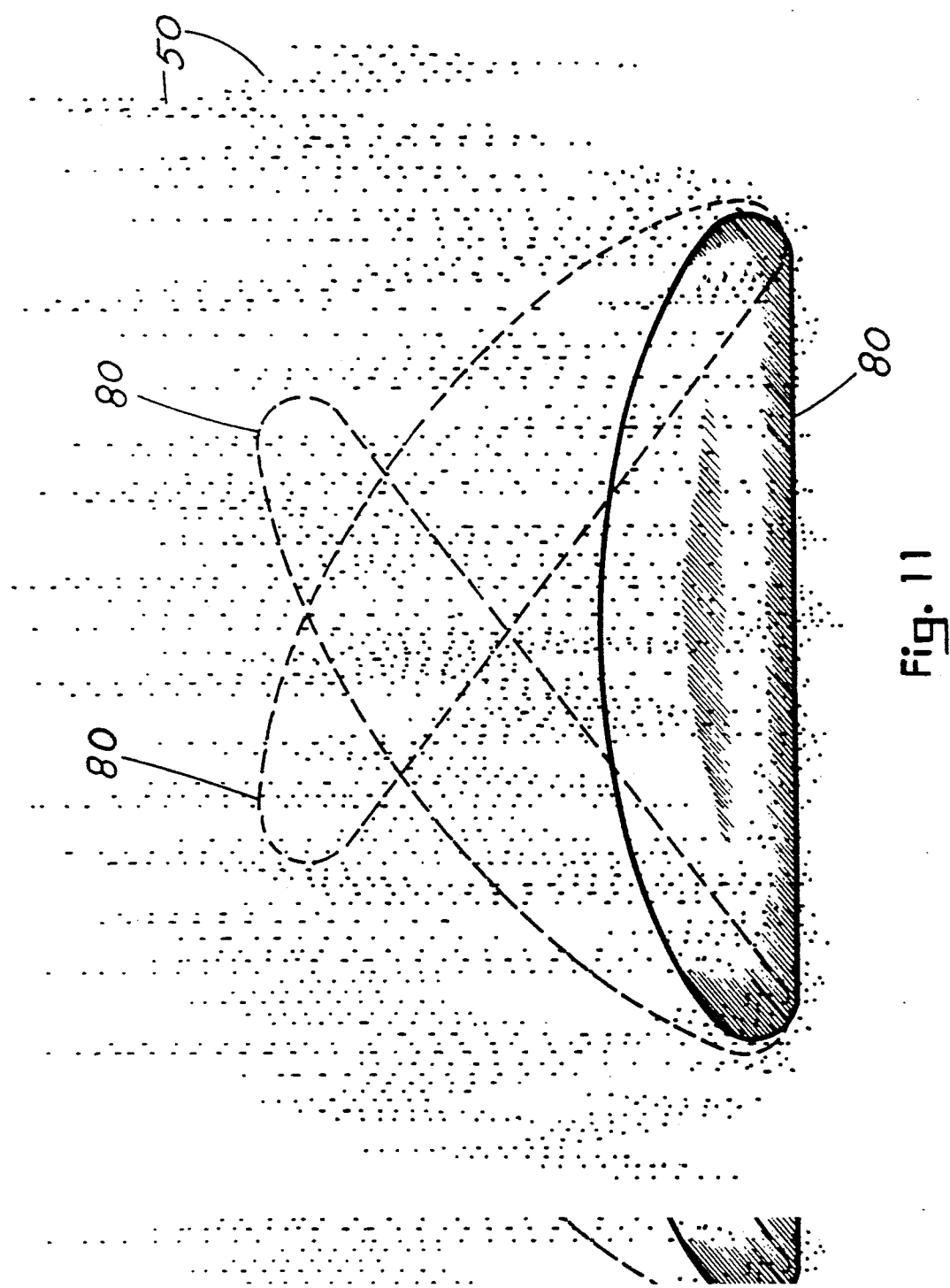

FIG. 11 is illustrative of a flat bottomed cookie or pastry having under-curved side edges. Shown using dotted lines is the cookie angled as it would be by a tilted article support tray as it is sequentially repositioned relative to the vertically falling powdered sugar in order to coat the under-curved side edges. The article support tray is not shown in this view, although the tray in practice would be directly underneath and supporting the flat bottom of the cookie, with the bottom of the tray angled identically to the angle of the flat bottom of the cookie or pastry.

Figure 12:
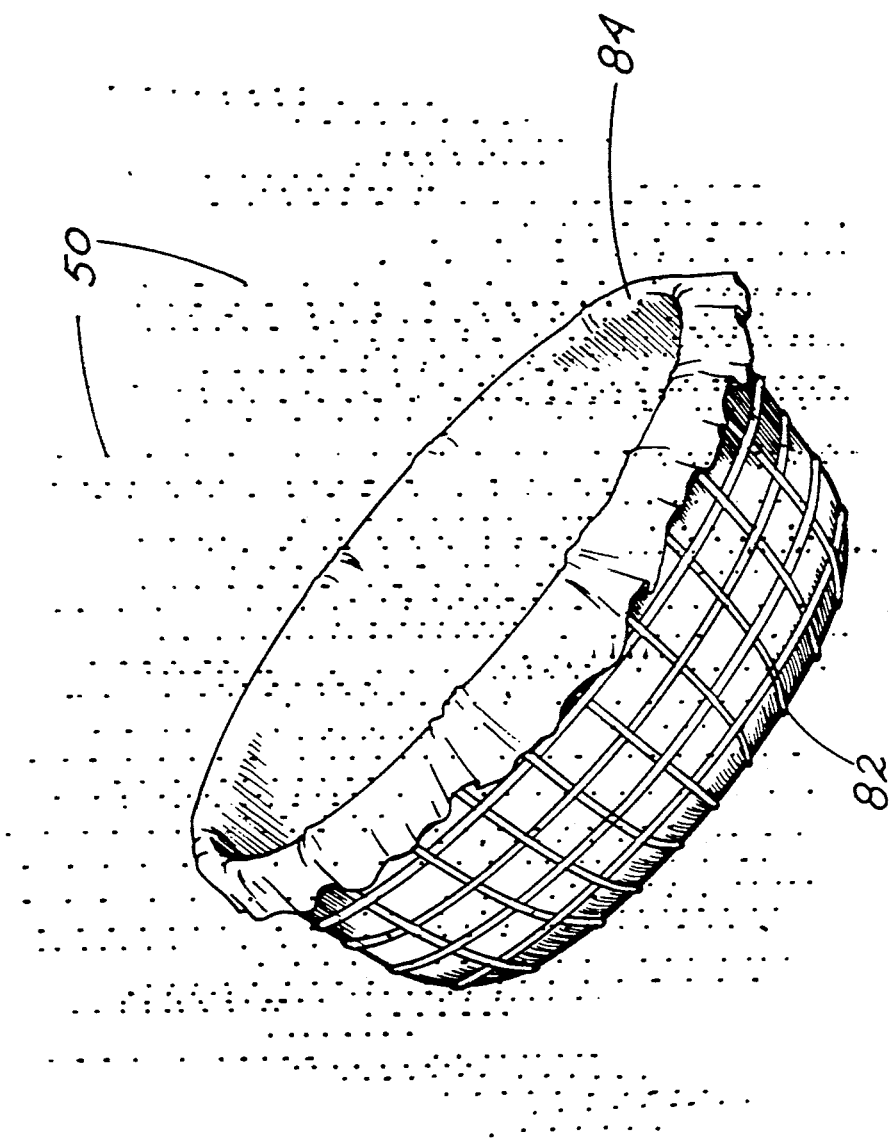

FIG. 12 is illustrative of a proofing basket with a liner therein as it would be angled by a tilted article support tray relative to the vertically falling flour. Both the interior bottom and the upwardly angled sidewalls of the proofing basket liner are being coated with the vertically falling flour. The article support tray is not shown in this view.

DESCRIPTION OF THE PREFERRED EMBODIMENT

Referring now to the drawings in general where the preferred embodiment of my invention is illustrated with the article powdering apparatus configurative of the immediate invention generally designated apparatus 10. Apparatus 10 is comprised of rectangular, generally dust tight housing 12 having a top panel 16, two vertical sidewall panels 13, two vertical end panels 14, and a plurality of attached bottom panels forming a funnel-shaped housing bottom 20. Panels 13, 14, 16, and funnel shaped housing bottom 20 of housing 12 are affixed together to enclose and define an interior powdering chamber 17. Housing 12 is preferably made of stainless steel, and is shown in the drawings supported by four attached legs 15.

Figure 1:
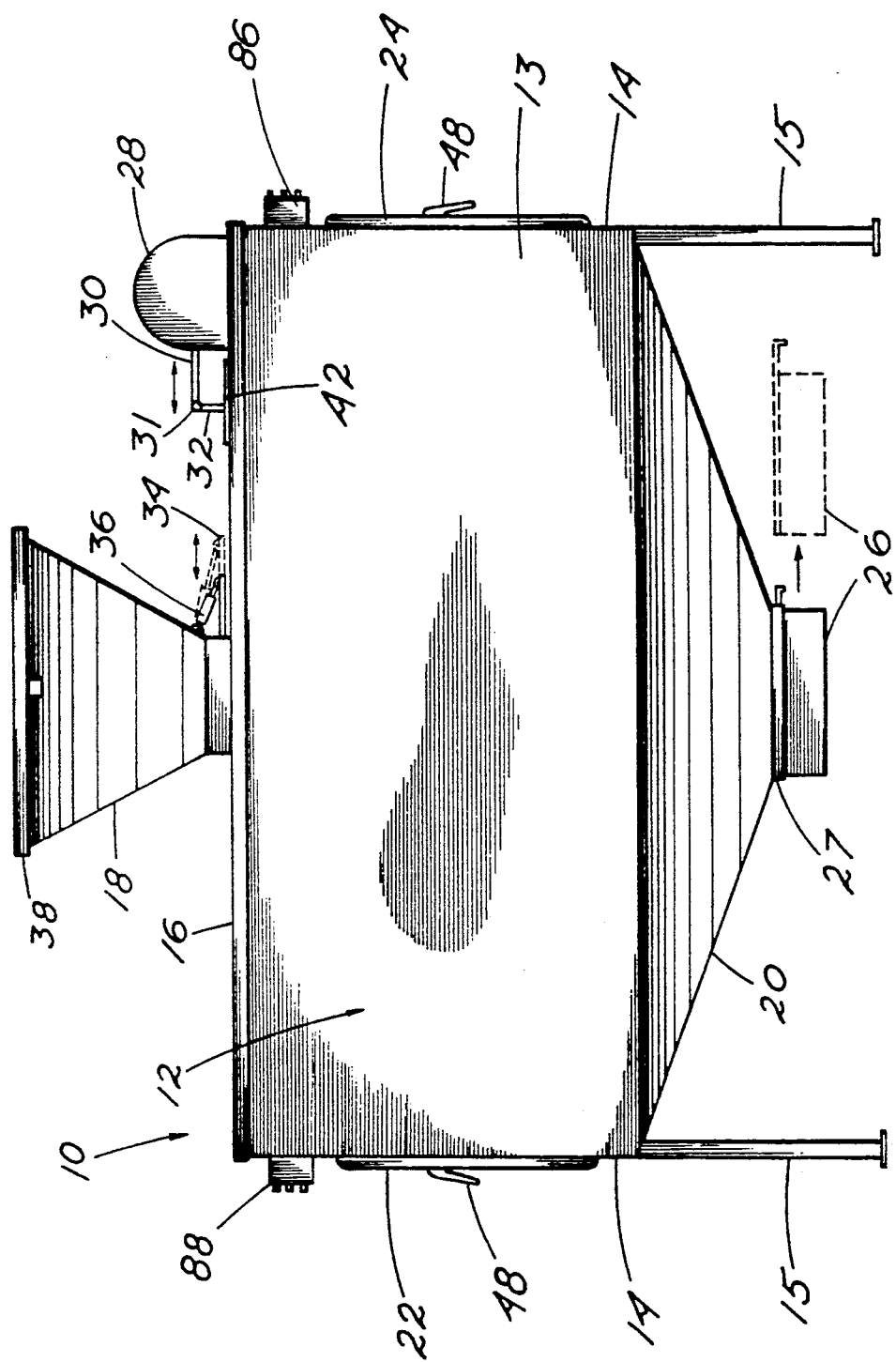

Funnel-shaped housing bottom 20 being structured of smooth, downwardly sloped panels, directs and allows depositing of powder 50 from housing 12 through an opening 21 at the lowest point in housing bottom 20 into a removable collecting drawer 26. In FIG. 1, collecting drawer 26 is shown retained in a collecting drawer holding receiver 27, and also shown by dotted lines removed. Drawer holding receiver 27 is arranged collar-like around the exterior edges of opening 21 with the receiver 27 structured of a three-sided channel-metal frame with the channels facing inward. One end of the channeled metal frame of drawer receiver 27 is left open to allow outwardly flanged top edges of drawer 26 to slide into the channels of drawer holding receiver 27 for retention of drawer 26 therein. Other well known structures to removably affixed a drawer over an opening are anticipated and could be used.

Figure 3:
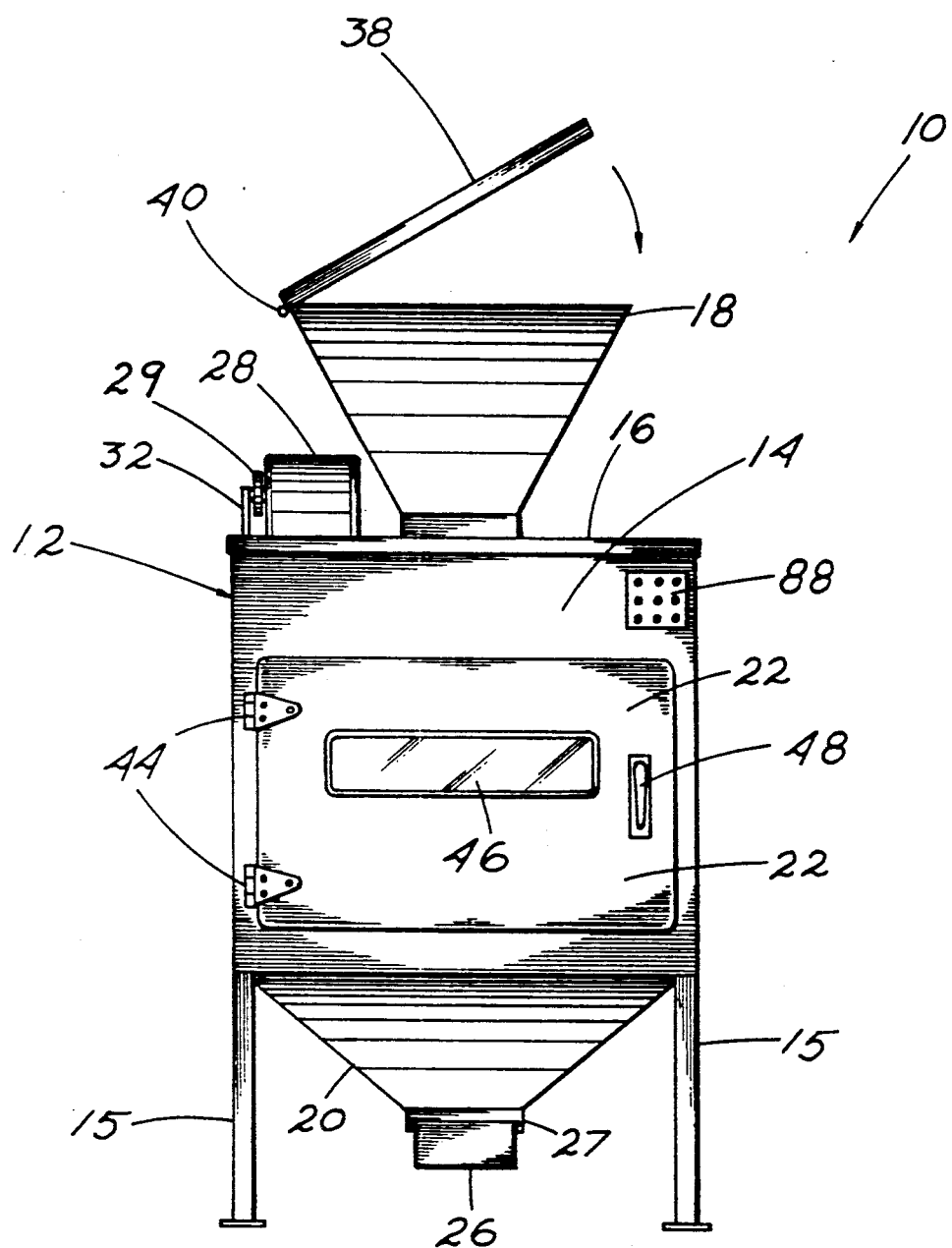
Figure 4:
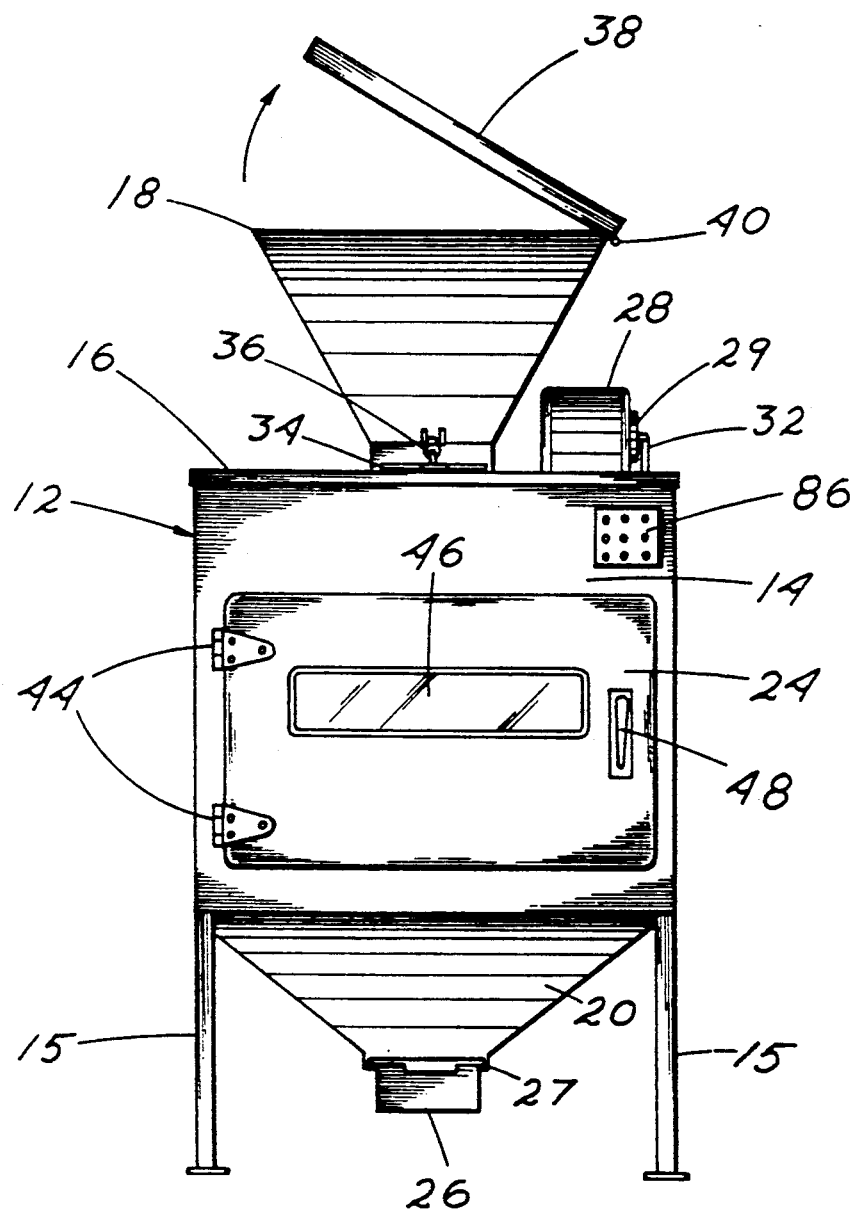
Figure 5:
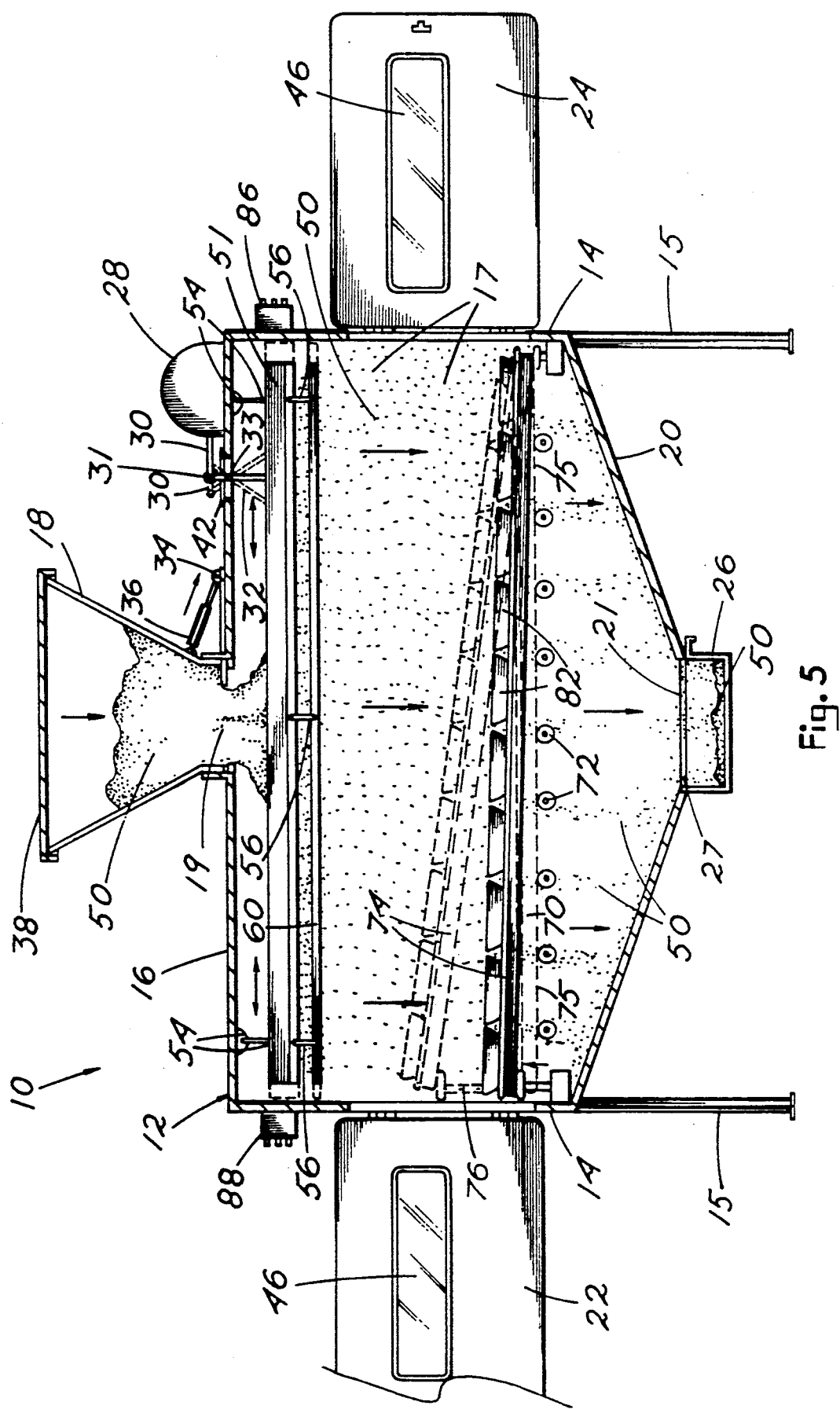
Figure 6:
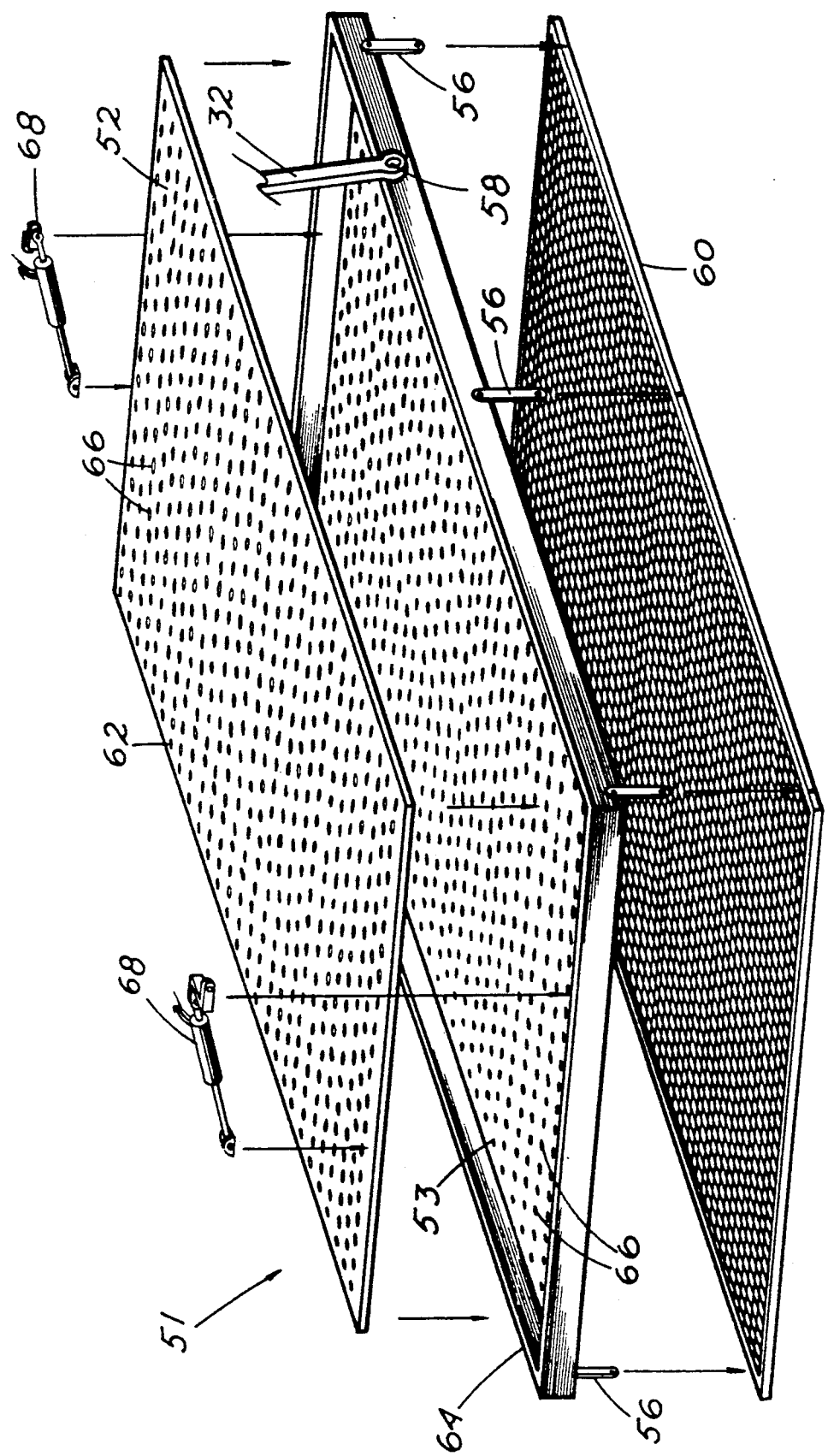
FIG. 6 is a perspective exploded view of the powder distributing and sifting screen assembly showing two apertured panels of the distributor above the sifting screen. Two power actuated arms or push cylinders are shown above the top panel.
Figure 7:
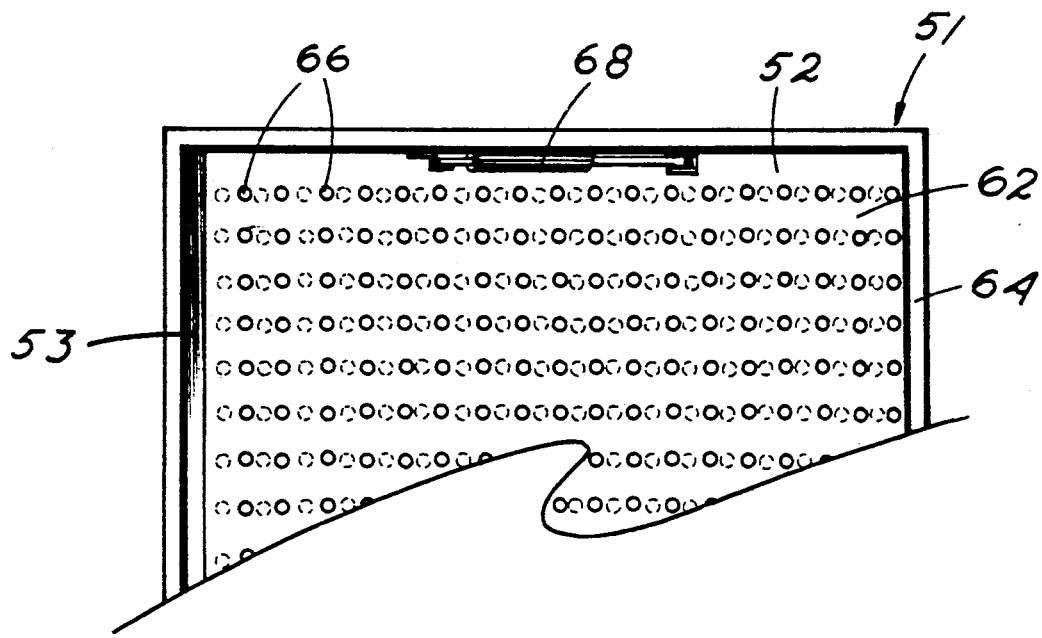
FIG. 7 is a top view of the assembled powder distributor showing the two apertured panels with the apertures thereof misaligned to close the panels to any dispensing of powder onto the screen shown in FIG. 6.
Figure 8:
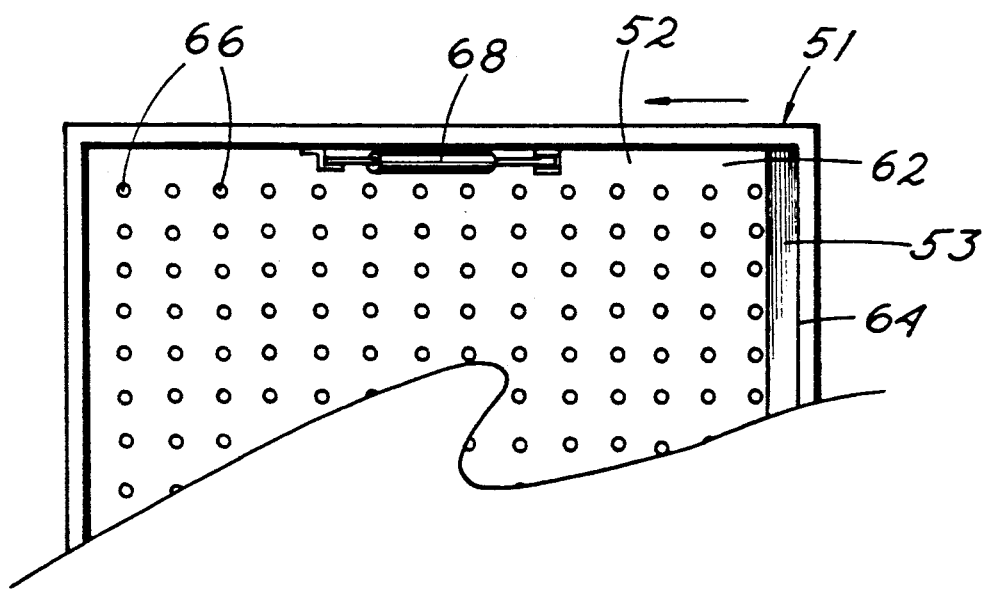
FIG. 8 is the same view as FIG. 7 but with the apertures of the distributor panels aligned to allow dispensing of powder onto the sifting screen.

As the drawings show, both ends of housing 12 have openings in end wall panels 14 closable by doors 22 and 24 best seen in FIG. 3 and FIG. 4. Door 22 is designated front door 22 and door 24 is designated rear door 24 because these doors are normally opened for access into powder chamber 17 in that order, front door 22 for in putting articles, cookie or pastry 80, for powdering, and rear door 24 for removing the powdered cookie or pastry 80. Doors 22 and 24 are attached to housing end wall panels 14 by hinges 44 and latched shut by latch handles 48 or magnetic seals similar to those used on refrigerator doors. Door windows 46 in both doors 22 and 24 are arranged centrally to allow viewing the interior of powdering chamber 17. As can be seen in FIG. 3 and FIG. 4, the ends of apparatus 10 are generally duplicative with a push button start-stop control station 86 on one end, and a PC station 88 in similar position at the oppositely disposed end. Computerized programmable controllers such as PC station 88 are available from several U.S. manufacturers such as the Allen-Bradley company of Cleveland, Ohio, U.S.A. The PC station 88 used with my invention has a start/-stop button arrangement on the front thereof to allow activation of the electronics of the PC 88. Push button start-stop control station 86 is wired to PC station 88 and allows activation of PC 88 from the opposite end of housing 12.

The positioning of a powder supply hopper 18 relative to electric motor 28 is shown in the first five figure illustrations. Powder supply hopper 18 provides funneling and a reservoir for a supply of powder 50 such as sugar or flour, and is attached centrally to top panel 16 of housing 12. Hopper 18 has an open top end and an open bottom end. The open top end of hopper 18 allows filling hopper 18 with powder 50. An openable lid 38 attached to hopper 18 by hinge 40 is provided to cover the open top end of hopper 18. The open bottom end of hopper 18 is aligned with a centrally positioned opening through top panel 16, designated powder input opening 19. Powder input opening 19 allows introduction of a metered amount of powder 50 into the upper portion of powdering chamber 17 of housing 12 according to the opening and the closing of a powder metering valve, designated hopper flow door 34. Hopper flow door 34 is a flat panel door slidably retained at the bottom opened end of hopper 18 over powder input opening 19.

Figure 2:
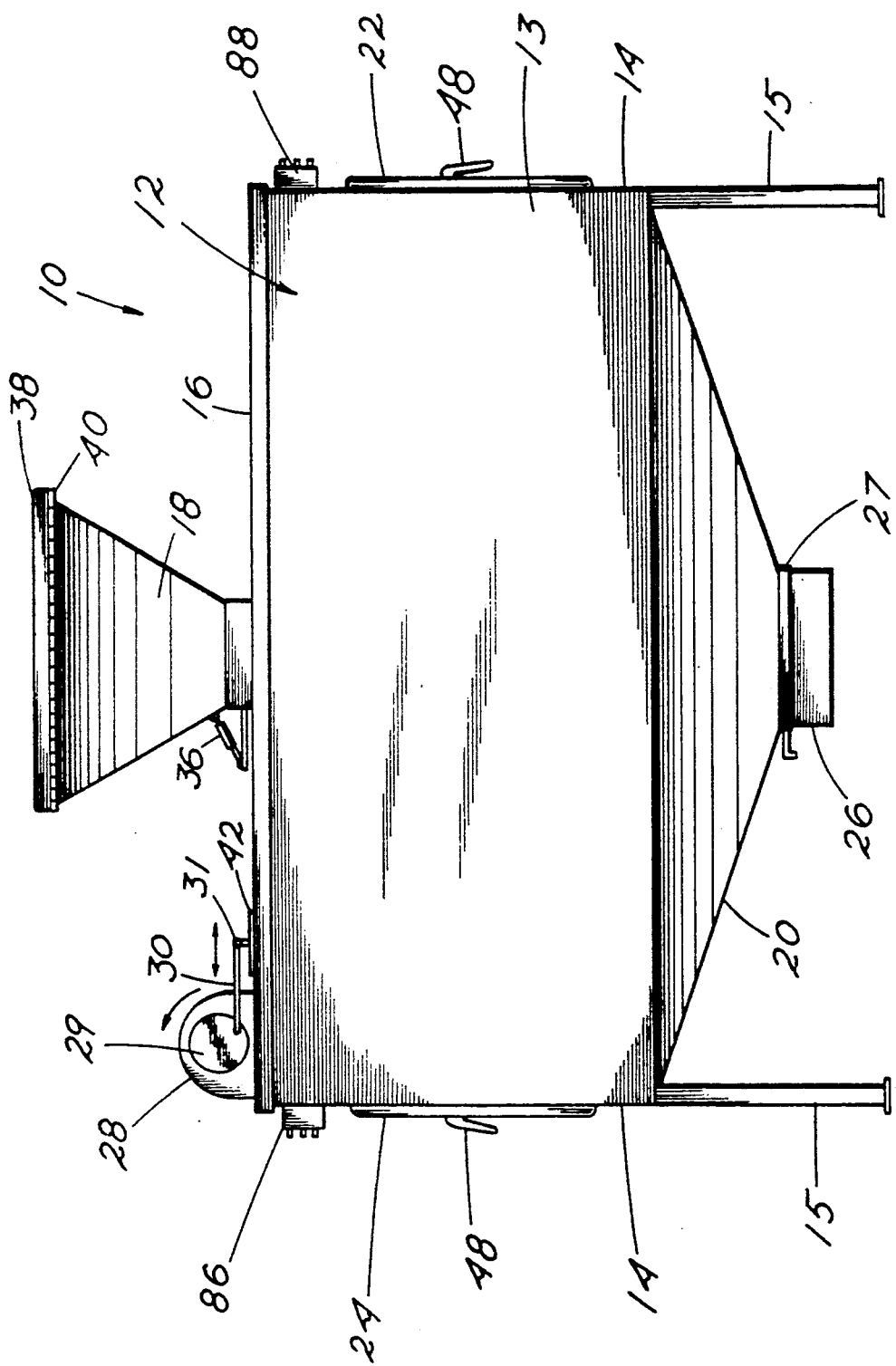

Door 34 functions as a shut-off door to regulate the flow of powder 50 from hopper 18 through opening 19 into powdering chamber 17. The opening and closing of door 34 is powered by hopper door power arm 36. Power arm 36 is attached at one end thereof to the side of hopper 18, and attached at the oppositely disposed end thereof to one end of shut-off door 34 as shown in FIG. 1 and 2. Power arm 36 is electrically powered and is controlled by PC station 88, which is programmed to open and close door 34 automatically. It is anticipated hopper 18, power arm 36 and door 34 could be replaced with a properly controlled screw auger conveyor or conveyor belt bringing powder 50 from a large, remotely placed hopper, with the on and off switching of the conveyor being used to control or meter the flow of powder 50 dispensed into powdering chamber 17 through opening 19.

In the upper section of powdering chamber 17 of housing 12 as shown in the FIG. 5 illustration is powder distributor 51 having screen 60 attached below by rigid screen hangers 56. Powder distributor 51 with attached screen 60 functions as a single powder distributing and sifting structure, and also function to a degree as a powder metering device. Powder distributor 51 is generally centered in powdering chamber 17 above article support tray 74 and below powder input opening 19. Powder distributor 51 is positioned to receive powder 50 dropped through opening 19, and sized relative to the interior dimensions of powdering chamber 17 to allow a small degree of movement therein. Powder distributor 51 is comprised of top apertured plate 62 arranged slidably covering the bottom inside of a distributor bottom apertured rimmed tray 64 as shown in FIG. 6, 7, and 8. Top apertured plate 62 has a plurality of apertures 66 therethrough. Distributor bottom apertured rimmed tray 64 has a plurality of apertures 66 alignable and misalignable with the apertures 66 of top apertured plate 62 providing shuttered apertures through powder distributor 51 extending from an upper surface area or side 52 through a lower surface area or side 53 of distributor 51.

Apertures 66 are normally closed by way of misalignment of apertures 66 in top apertured plate 62 with the apertures 66 in the bottom apertured rimmed tray 64 as shown in FIG. 7 where apertures 66 are illustrated misaligned and closed. Top apertured plate 62 is sized slightly smaller in one dimension relative to rimmed tray 64 in order to allow sliding of plate 62 within the interior boundaries of the rim of rimmed tray 64 as shown in FIG. 7 and 8. Two electrically powered arms 68 are used to slide top apertured plate 62 back and forth on rimmed tray 64 in order to align and misalign the apertures 66 of plate 62 and apertured rimmed tray 64.

One end of each of the actuator arms 68 is attached to the rim of apertured rimmed tray 64, and the opposite end of each of the actuator arms 68 is attached to top apertured plate 62 as shown in FIG. 7 and 8. When the two sets of apertures 66 are in alignment, apertures 66 are in the opened position and powder 50 is metered through distributor 51. Illustrated in FIG. 8 are apertures 66 aligned and open. When apertures 66 are misaligned, apertures 66 are closed, prohibiting the passage of powder 50 from the upper surface area 52 through and out the lower surface area 53 of powder distributor 51. Actuator arms 68 are wired to PC 88 to allow automatic opening and closing of apertures 66.

Distributor 51 is pivotally attached by a plurality of pivotal hangers 54 to top housing panel 16, best shown in FIG. 5. Rigidly attached with hangers 56 directly underneath distributor 51 and in close proximity thereto is screen 60. Screen 60 is a finely meshed powder sieve having an upward facing surface area at least equal to the downward facing or powder dispensing side of powder distributor 51 to allow screen 60 to receive all powder 50 dispensed through distributor 51 to land on screen 60 and be sifted prior to being further dispensed vertically downward toward article support tray 74 and articles resting thereon.

Distributor 51 and screen 60 are attached by way of pivotal hangers 54 and rigid hangers 56 respectively, and sized relative to the interior dimensions of powdering chamber 17 to allow a concurrent oscillatory movement within powdering chamber 17. The oscillatory movement is provided to distributor 51 and screen 60 by electric motor 28 and a movement actuator rod 32. Actuator rod 32 is centrally attached at pivotal attachment 33 to housing top panel 16, indicated in FIG. 5. Actuator rod 32 passes generally vertically through opening 42 of housing top panel 16. Opening 42 is an elongated opening having rubber dust seals therearound which actuator rod 32 extends therethrough, best shown in FIG. 5. The lower end of actuator rod 32 fastens to the edge of apertured rimmed tray 64 of distributor 51 at pivotal attachment 58 shown in FIG. 6. The terminal end of actuator rod 32 above top panel 16 is pivotally connected at pivotal connection 31 to actuator rod 30. Actuator rod 30 is pivotally attached off center to motor wheel 29. Motor 28 is wired to PC 88 for automatic on/off control. When motor 28 is turned on and operating, the turning of motor wheel 29 moves actuator rod 30 back and forth in a generally horizontal plane, moving the upper and lower ends of actuator rod 32 back and forth due to pivotal attachment 33 as indicated in FIG. 5. The back and forth movement of the lower end of actuator rod 32 in turn causes powder distributor 51 and screen 60 to rapidly oscillate or vibrate back and forth. Other structures to apply oscillatory movement or vibration to distributor 51 and attached screen 60 can of course be used within the scope of the invention.

Removably housed towards the bottom within powdering chamber 17 is the article support tray 74 having an apertured bottom with mesh-type openings designated, mesh bottom 75. Article support tray 74 is for supporting articles, cookies or pastry 80 and proofing baskets 82, to be dusted with powder 50. Article support tray 74 can be inserted through front door 22 on one end of the housing 12 and removed through rear door 24 on the opposite end of housing 12. Article support tray 74 may be rolled in and rolled out on rollers 72 attached to brackets 70. Brackets 70 are attached to the interior of housing 12. The structure of article tray support brackets 70 with rollers 72 attached for supportive guidance and movement of article support tray 74 is detailed in FIG. 9 relative to housing 12 shown in dotted lines. Article support tray 74 having mesh bottom 75, shown in FIG. 10 and not visible but indicated in FIG. 5, allows excess powder 50 to drop through article support tray 74 and on down into collecting drawer 26.

Four electrically powered lifting arms 76 are affixed for up and down mobility in four opposite interior corners of housing 12 under the corners of article support tray 74. The electric powered lifting arms are wired to, and controlled by PC 88. Lifting arms 76 alternately move up and down, activated electronically in a sequence by PC station 88 to move tray 74 in a tilting and elliptical movement upward and downward. Desirably, only one lifting arm 76 is in the raised position at a time, lifting one corner of tray 74 at a time. This elliptical movement presents sides and tops of cookie or pastry 80, and the interior walls and the inside bottom of basket liner 84 of proofing basket 82 at various angles for complete powdering. See FIG. 11 and FIG. 12. Lifting arms 76 are affixed at the upper ends thereof with pointed disks 78. The disk portion of pointed disks 78 is the surface which abuts the bottom of tray 74 for lifting, and the pointed portion of pointed disks 78 is aligned to penetrate through the openings in mesh bottom 75 of tray 74 to stabilize retention of the corners of tray 74 during lifting and tilting movement. When PC 88 turns the power off, the slidable portion of lifting arms 76 with pointed disks 78, recede clear of article support tray 74 to allow sliding removal of tray 74 on rollers 72. See FIG. 9 and FIG. 10.

Although not shown in the drawings, some type of electrical feed line would of course have to be attached to PC station 88 to feed power to the electrically operated elements of the article powdering apparatus 10. The electrical feed line would desirably be a disconnectable rubber cord, although hard wiring would function.

The operation and sequencing of apparatus 10 controlled by PC station 88 is as follows. For use, front door 22 is opened and article support tray 74, loaded with proofing baskets 82 having liners 84, or cookies or pastries 80 is pushed into powdering chamber 17 riding on rollers 72 and guided by the upper edges of bracket 70. Front door 22 is closed and retained by handled door latches 48. Rear door 24 is also closed and latched. Hopper 18 is filled with a desired powder 50, flour or sugar. PC station 88 is activated by pressing either the start button located on PC station 88, or the start button of start/stop control station 86. Motor 28 is turned on by PC station 88 to apply oscillatory movement to powder distributor 51 and screen 60. Power arm 36 is switched into operation by PC station 88 to open hopper flow door 34 allowing a measured amount of powder 50 through powder input opening 19 before PC station 88 causes hopper flow door 34 to close. The measuring or metering of powder 50 into powdering chamber 17 is determined by the length of time hopper flow door is left open, and desirably only enough powder 50 is dispensed from hopper 18 for one powdering cycle. The powder 50 entering powdering chamber 17 through opening 19 descends downward onto upper surface area 52 of top apertured plate 62 of distributor 51. Apertures 66 of distributor 51 are misaligned or closed when powder 50 is deposited on top apertured plate 62. The rapid oscillatory movement of powder distributor 51 causes powder 50 to spread out evenly, or to vibrate into a generally level plane over the entire upper surface area 52 of top apertured plate 62, with powder 50 being retained within powder distributor 51 by the rim of bottom rimmed tray 64.

After powder 50 is well spread on upper surface area 52 of distributor top apertured plate 62, actuator arms 68 activated by PC station 88 shift the position of distributor top apertured plate 62 so apertures 66 in plate 62 and apertures 66 in bottom apertured tray 64 are aligned and powder 50 passes through distributor 51, dropping from lower surface area 53 onto the oscillating screen 60 below. Powder distributor 51 dispenses all of powder 50 retained thereon evenly over the entire upward surface of screen 60. Powder 50 is then further disbursed through the sifting action of the moving screen 60 and falls vertically downward through powdering chamber 17 to be deposited on articles 80 or 82 resting on article support tray 74. While sifted powder 50 is falling onto articles 80 or 82, the corners of article support tray 74 are sequentially raised one at a time by lifting arms 76 automatically activated at PC station 88. In FIG. 11, the tilting elliptical movement of an article, a cookie or pastry 80, is illustrated relative to vertically falling powder 50 being deposited on the article. This movement provides for complete upper and side powdering of the article, a cookie or pastry 80. The FIG. 12 drawing is illustrative of a proofing basket 82 being tilted and turned for applying full powdering of a basket liner 84, by settling applications of finely sifted, evenly dispersed powder 50.

Toward the end of a powdering cycle, PC station 88 activates actuator arms 68 to close aperture 66 in preparation for another powdering cycle, and then turns all the powered equipment off. At this point, article support tray 74 is manually removed through rear door 24 while another article tray 74 is inserted into powdering chamber 17 through front door 22 and the powdering process is repeated. After several powdering operation are completed, collecting drawer 26 can be removed and the powder 50 therein reused.

Apparatus 10 principally constituting the immediate invention is designed for continuous use and for maintaining a minimal of dust in a working area. Powder distributor 51 and sifting screen 60 are positioned above article support tray 74 encased in housing 12 in a structural and mechanical arrangement to evenly distribute a fine coating of powder 50 over all exposed surfaces of articles on article support tray 74 without producing an excessive suspension of dust in the work area air. Keeping dust to a minimum allows continued opening of doors 22 and 24 and replacement of article support trays 74 shortly after each application of powder 50, increasing the overall use cycle rate of apparatus 10.

It should be noted that although I have described all of the power actuated elements such as motor 28, power arm 36, actuator arms 68, and lifting arms 76 to be electrical devices, I anticipate hydraulically or pneumatically powered devices using solenoid control valves could be used as substitutes for these electrical devices. Also, although the convenience and accuracy of the solid state electronics of PC station 88 is desirable, PC station 88 could be replaced with a plurality of individual electric timers and pneumatically timed circuit contactors to achieve the desired automatic functioning of my powdering apparatus 10. Also, since some bakeries switch back and forth between different types of flour or powder, I anticipate installing a small clean-out door in a sidewall of hopper 18 slightly above hopper flow door 34 to allow simple removal of any powder 50 left therein so another type of powder 50 may be placed in hopper 18.

It should be further noted that the functional embodiment of the invention described in the specification and illustrated in the drawings is for exemplification purposes only. The descriptions and drawings are not intended to limit the invention to a particular structure, and I reserve the right to modify the structuring of my invention to any extent so long as the modifications remain within the intended scope of the appended claims.

What I claim as my invention is:

1. An article powdering apparatus structured to provide improved even distribution of powder onto articles, comprising in combination;

a housing defining an article powdering chamber;

an article support tray removably contained within said powdering chamber, said article support tray having apertures through a surface thereof providing means for powder to fall through said article support tray and into a powder collection drawer positioned in a funnel-shaped bottom portion of said housing;

said housing having at least one opening sized to allow removal of said article support tray from said powdering chamber;

at least one openable door affixed to said housing over said at least one opening of said housing;

a powder supply means for supplying powder to said housing;

a powder metering means for metering a predetermined amount of powder from said powder supply means through a powder entrance in said housing, said powder metering means operable by powered means controlled by electric timing and sequencing means, said powder entrance providing means to introduce metered powder into an upper portion of said powdering chamber;

a powder distributor having shuttered apertures operable between opened and closed positions extending from an upper surface area of said powder distributor through a lower surface area of said powder distributor, said powder distributor movably affixed within said powdering chamber below said powder entrance and above said article support tray, said powder distributor positioned to receive metered powder from said powder entrance onto said upper surface area with said shuttered apertures in the closed position;

a powered means in communication with said powder distributor and controlled by said electric timing and sequencing means, said powered means providing means for providing oscillatory movement to said powder distributor, said oscillatory movement providing means for generally evenly distributing received metered powder over said upper surface area of said powder distributor prior to said shuttered apertures being opened;

a powered shutter control means in communication with said powder distributor and controlled by said electric timing and sequencing means, said powered shutter control means providing means for opening and closing said shuttered apertures, the opening of the apertures sequenced to occur during said oscillatory movement and subsequent to even distributing of powder on said upper surface area of said powder distributor, said opening of said shuttered apertures with said oscillatory movement of said powder distributor providing means for generally evenly dispensing powder downward from said powder distributor;

a screen movably affixed within said powdering chamber below said powder distributor and above said article support tray, said screen sized and placed to receive powder dispensed from said powder distributor;

a powered screen oscillating means in communication with said screen and controlled by said electric timing and sequencing means, said powered screen oscillation means providing oscillatory movement to said screen, the oscillatory movement of said screen providing means of sifting powder received from said powder distributor through said screen and dispensing sifted powder generally vertically downward onto said article support tray and any articles resting on said article support tray within said powdering chamber;

powered tray tilt means in communication with said article support tray and controlled by said electric timing and sequencing means, said powered tray tilt means providing means for tilting said article support tray at various angles during downward dispensing of sifted powder from said screen.

2. An article powdering apparatus according to claim 1 wherein said electric timing and sequencing means includes a computerized programmable controller.

* * * * *